US007777697B2

(12) United States Patent
Jeon et al.

(10) Patent No.: US 7,777,697 B2

(45) Date of Patent: Aug. 17, 2010

(54) ELECTRON EMISSION DISPLAY AND DRIVING METHOD THEREOF

(75) Inventors: Dong Hyup Jeon, Cheonan-si (KR); Chul Ho Lee, Cheonan-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 915 days.

(21) Appl. No.: 11/408,044

(22) Filed: Apr. 21, 2006

(65) Prior Publication Data

US 2006/0267881 A1 Nov. 30, 2006

(30) Foreign Application Priority Data

May 27, 2005 (KR) ..................... 10-2005-0044988

(51) Int. Cl.

*G09G 3/20* (2006.01)
*G09G 3/38* (2006.01)
*G09G 3/34* (2006.01)
*H01J 1/62* (2006.01)
*H01J 63/04* (2006.01)
*H04N 3/12* (2006.01)
*H04N 5/66* (2006.01)
*H04N 9/12* (2006.01)

(52) U.S. Cl. ...................... 345/75.2; 345/690; 345/105; 313/495; 348/796

(58) Field of Classification Search ................ 345/74.1, 345/75.1, 75.2, 690–699, 105, 106; 313/495–497; 348/796

See application file for complete search history.

(56) References Cited

U.S. PATENT DOCUMENTS

2005/0099367 A1 * 5/2005 Kang et al. ................ 345/74.1

FOREIGN PATENT DOCUMENTS

KR 10-0263311 5/2000

* cited by examiner

*Primary Examiner*—Kevin M Nguyen
*Assistant Examiner*—Cory A Almeida
(74) *Attorney, Agent, or Firm*—Robert E. Bushnell, Esq.

(57) ABSTRACT

An electron emission display and a driving method thereof, where a brightness is adjusted differently according to a brightness of a frame in order to reduce power consumption and prevent a brazing fire from occurring, and to easily recognize a change of the brightness. The display includes a pixel portion adapted to receive a data signal and a scan signal, the pixel portion being further adapted to display an image, a data driver adapted to generate the data signal using video data, the data driver being further adapted to transfer the data signal to the pixel portion, a scan driver adapted to transfer the scan signal to the pixel portion, a timing controller adapted to transfer a drive signal to the data driver and to the scan driver, the drive signal driving the data driver and the scan driver, a data processor adapted to generate a control signal corresponding to frame data obtained by summing a size of video data input during one frame and a power supply section adapted to generate a drive power source and transfer the drive power source to the pixel portion, the data driver, the scan driver, the timing controller, and the data processor, wherein a brightness of the pixel portion is varied according to the control signal, and an amount varied of the brightness is determined based upon the size of the video data during the one frame.

10 Claims, 6 Drawing Sheets

ELECTRON EMISSION DISPLAY AND DRIVING METHOD THEREOF

CLAIM OF PRIORITY

This application makes reference to, incorporates the same herein, and claims all benefits accruing under 35 U.S.C. §119 from an application earlier filed in the Korean Intellectual Property Office on 27 May 2005 and there duly assigned Serial No. 10-2005-44988.

BACKGROUND OF THE INVENTION

1. Field of the Invention

The present invention relates to an electron emission display and a driving method thereof, and more particular to an electron emission display and a driving method thereof, which adjust a brightness differently according to a brightness of a frame in order to reduce power consumption and prevent a gradual failure from occurring.

2. Discussion of the Related Art

Lightweight and thin flat panel displays have been used as either a display device for a portable information terminal such as a personal computer, a portable telephone, and a personal digital assistant (PDA) or a monitor of all kinds for information devices. A liquid crystal display (LCD) using a liquid crystal panel, an organic light emitting display using an organic light emitting diode, and a plasma display panel (PDP) using a plasma panel are examples of flat panel displays.

A flat panel display is classified into active matrix type displays and passive matrix type displays according to its construction, as well as a memory drive type and a non-memory drive type according to a light emitting theory. In general, the active matrix type can correspond to the memory drive type, and the passive matrix type can correspond to the non-memory drive type. The active matrix type and memory drive type displays emit light in frames. In contrast to this, the passive matrix type and non-memory drive type displays emit light in lines.

In commonly used flat panel displays, TFT-LCD (Thin Film Transistor Liquid Crystal Display) is an active matrix type, and a newly developed organic light emitting diode (OLED) is also an active matrix type. In contrast to this, an electron emission display is a passive matrix type display device. Unlike flat panel displays, the electron emission display is a non-memory drive type and uses a line scan type that emits light only when a selected line among horizontal lines is selected while sequentially selecting the horizontal lines. That is, the electron emission display drives to have a constant duty ratio.

An electron emission display includes a pixel portion, a data driver, a scan driver, a timing controller, and a power supply section. The pixel portion includes pixels formed at intersecting parts of cathode electrodes C1, C2 . . . Cn and gate electrodes G1, G2 . . . Gn. In the pixels, electrons emitted by the cathode electrodes collide with the anode electrodes to emit light of fluorescent substances, thus representing a gray scale of an image. The represented gray scale of an image changes according to a value of an input digital image signal. In general, in order to adjust the gray scale expressed according to the value of a digital image signal, a Pulse Width Modulation mode or a Pulse Amplitude Modulation mode can be used.

The data driver is coupled with the cathode electrodes C1, C2 . . . Cn, and generates and transfers a data signal to the pixel portion, so that the pixel portion emits light corresponding to the received data signal. The scan driver is coupled with the gate electrodes G1, G2 . . . Gn, and generates and transfers a scan signal to the pixel portion, the pixel portion sequentially emits light during a predetermined time period in horizontal line units and in a line scan manner. This causes a total screen to be displayed, thus reducing the costs of circuit and power consumption.

The timing controller transfers a data driver control signal and a scan driver control signal to the data driver and the scan driver in order to control operations of the data driver and the scan driver, respectively. The power supply section supplies power to the pixel portion, the data driver, the scan driver, and the timing controller, so that the pixel portion, the data driver, the scan driver, and the timing controller can operate.

The electron emission display having the construction as mentioned above expresses a gray scale according to brightness data regardless of total frame data. Consequently, in order to express more brightness, more current flows through the pixel portion. In order to express less brightness, less current flows through the pixel portion. In this scenario, when more current flows through the pixel portion to express a higher brightness, a larger load burdens the power supply section. This results in the power supply section having to put out a high output. Because a person can more easily sense a brightness change in dark image than a brightness change in a bright image, the brightness change amount of the bright image should be increased. Therefore, what is needed is an electron emission display and a method to adjust brightness so that the power supply is not subject to excessive load while providing a better image.

SUMMARY OF THE INVENTION

It is therefore an object of the present invention to provide an improved electron emission display.

It is further an object of the present invention to provide an improved method of driving an electron emission display.

It is yet an object of the present invention to provide a method and a design for an electron emission display that adjusts brightness variations so that an image can be perceived better while not producing excessive load for the power supply.

It is still an object of the present invention to provide an electron emission display and a driving method thereof, which adjust a brightness differently according to a brightness of a frame in order to reduce power consumption and prevent brazing fire from occurring, and to easily recognize a change of the brightness.

The foregoing and/or other aspects of the present invention can be achieved by providing an electron emission display, including a pixel portion adapted to receive a data signal and a scan signal, the pixel portion being further adapted to display an image, a data driver adapted to generate the data signal using video data, the data driver being further adapted to transfer the data signal to the pixel portion, a scan driver adapted to transfer the scan signal to the pixel portion, a timing controller adapted to transfer a drive signal to the data driver and to the scan driver, the drive signal driving the data driver and the scan driver, a data processor adapted to generate a control signal corresponding to frame data obtained by summing a size of video data input during one frame and a power supply section adapted to generate a drive power source and transfer the drive power source to the pixel portion, the data driver, the scan driver, the timing controller, and the data processor, wherein a brightness of the pixel portion is varied according to the control signal, and an amount varied of the brightness is determined based upon the size of the video data during the one frame.

According to a second aspect of the present invention, there is provided a method of driving an electron emission display, the method including determining a size of frame data input during one frame by summing together video data of one frame, adjusting a voltage level of a drive power supply based upon the size of the frame data and adjusting a brightness according to the adjustment of the voltage level of the drive power supply, and differently adjusting a change amount of the brightness according to the size of the frame data.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
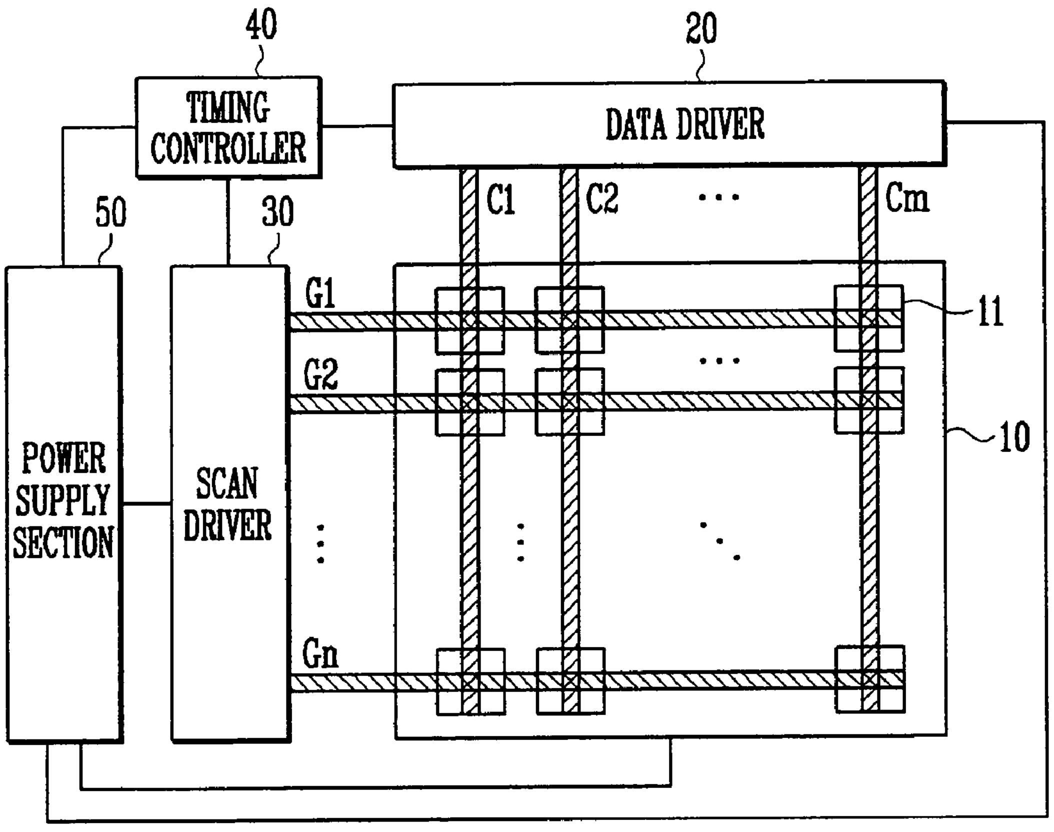
FIG. 1 is view showing a construction of an electron emission display.

Turning now to the figures, FIG. 1 is view showing a construction of an electron emission display. With reference to FIG. 1, the electron emission display includes a pixel portion 10, a data driver 20, a scan driver 30, a timing controller 40, and a power supply section 50. The pixel portion 10 includes pixels 11 formed at intersecting parts of cathode electrodes C1, C2 . . . Cn and gate electrodes G1, G2 . . . Gn. In the pixels 11, electrons emitted by the cathode electrodes collide with the anode electrodes to emit light of fluorescent substances, thus representing a gray scale of an image. The represented gray scale of an image changes according to a value of an input digital image signal. In general, in order to adjust the gray scale expressed according to the value of a digital image signal, a Pulse Width Modulation mode or a Pulse Amplitude Modulation mode can be used.

The data driver 20 is coupled with the cathode electrodes C1, C2 . . . Cn and generates and transfers a data signal to the pixel portion 10, so that the pixel portion 10 emits light corresponding to the data signal. The scan driver 30 is coupled with the gate electrodes G1, G2 . . . Gn, and generates and transfers a scan signal to the pixel portion 10. The pixel portion 10 sequentially emits light during a predetermined time period in horizontal line units and in a line scan manner. This causes the total screen to be displayed, thus reducing the cost of circuit and power consumption.

The timing controller 40 transfers a data driver control signal and a scan driver control signal to the data driver 20 and the scan driver 30 in order to control operations of the data driver 20 and the scan driver 30, respectively. The power supply section 50 supplies power to the pixel portion 10, the data driver 20, the scan driver 30, and the timing controller 40, so that the pixel portion 10, the data driver 20, the scan driver 30, and the timing controller 40 can operate.

The electron emission display having the construction of FIG. 1 above expresses a gray scale according to brightness data regardless of total frame data. Consequently, in order to express higher brightness, more current flows through the pixel portion 10. In order to express less brightness, less current flows through the pixel portion 10. When a lot of current flows through the pixel portion 10 to express a high brightness, a large load is applied to the power supply section 50. This results in the power supply section to have a high output. Furthermore, a person's eyes sense brightness change of dark image than that of bright image better. Consequently, brightness change amount of the dark image should be increased.

Figure 2:
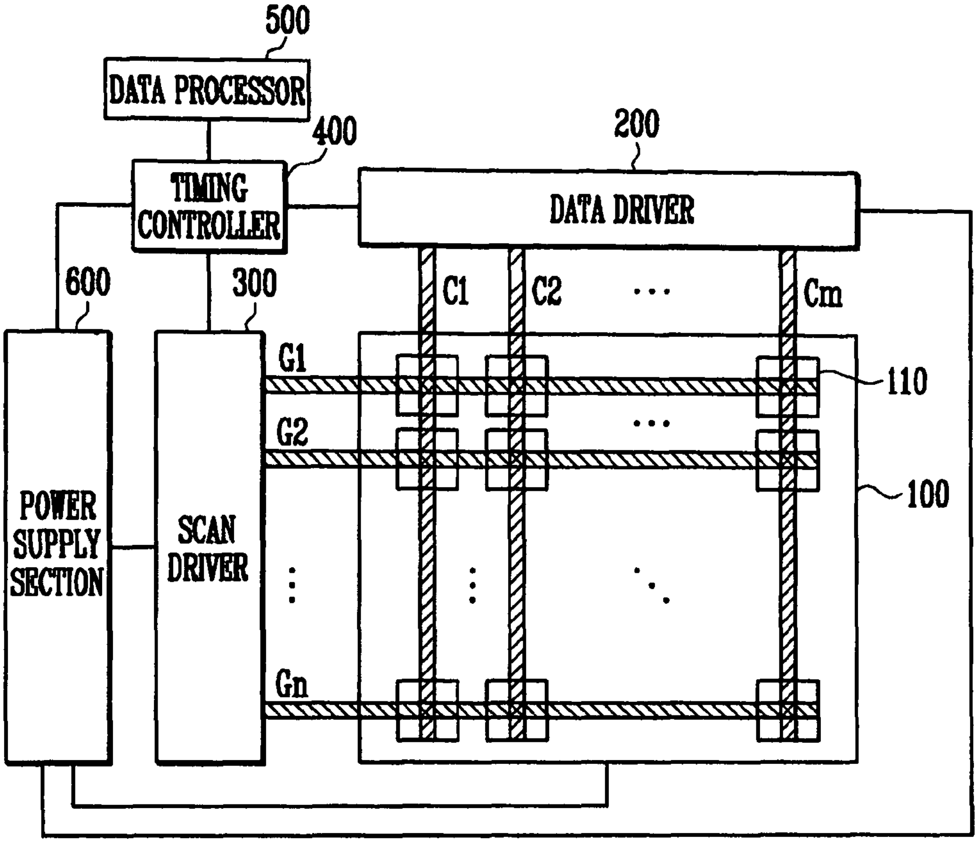
FIG. 2 is a view showing a construction of an electron emission display according to an embodiment of the present invention.

Turning now to FIG. 2, FIG. 2 is a view showing a construction of an electron emission display according to an embodiment of the present invention. Referring to FIG. 2, the electron emission display includes a pixel portion 100, a data driver 200, a scan driver 300, a timing controller 400, a data processor 500, and a power supply section 600.

In the pixel portion 100, a plurality of gate electrodes C1, C2 . . . Cn are arranged in a row direction, and a plurality of gate electrodes G1, G2 . . . Gn are arranged in a column direction. Electron emission sources are provided at every intersection part of the cathode electrodes C1, C2 . . . Cn and the gate electrodes G1, G2 . . . Gn to form pixels 110. In contrast to this, gate electrodes C1, C2 . . . Cn can be arranged in the column direction, whereas the gate electrodes G1, G2 . . . Gn be arranged in the row direction. Hereinafter, assuming that the gate electrodes C1, C2 . . . Cn are arranged in a row direction and gate electrodes G1, G2 . . . Gn are arranged in a column direction, the pixel portion 100 will be explained.

The data driver200 is coupled with the cathode electrodes C1, C2 . . . Cn, and transfers data signals to the cathode electrodes C1, C2 . . . Cn. The data driver 200 generates an electrode signal to turn-on/off pixels 110 formed at intersecting parts of cathode electrodes C1, C2 . . . Cn and gate electrodes G1, G2 . . . Gn.

The scan driver 300 is connected to the gate electrodes G1, G2 . . . Gn, selects one of the plurality of gate electrodes G1, G2 . . . Gn, and transfers the data signals to the pixels 110 connected to the gate electrodes G1, G2 . . . Gn.

The timing controller 400 receives an image signal and generates a control signal to drive the data driver 200 and the scan driver 300. Further, the timing controller 400 transfers the control signal to the data driver 200 and the scan driver 300. More specifically, the timing controller 400 generates a first control signal for driving the data driver 200, and a second control signal for sequentially selecting a horizontal line to drive the scan driver 300.

The data processor 500 limits brightness corresponding to brightness expressing one frame using video data inputted during one frame period in order to limit an amount of electrical current flowing through the pixel portion 100. The limitation of the brightness is achieved by adjusting and limiting a level of an output voltage of the power supply section 600.

The power supply section 600 serves to supply power to the pixel portion 100, the data driver 200, the scan driver 300, the timing controller 400, and the data processor 500. The power supply section 600 supplies an anode voltage to the pixel portion 100. Further, the power supply section 600 supplies a drive power source to the data driver 200, the scan driver 300, the timing controller 400, and the data processor 500. Furthermore, the power supply section 600 adjusts a voltage level of an output drive power source according to the limitation of brightness without significantly changing the amount of electric current flowing through the pixel portion 100. As a result, the power supply section 600 no longer has to put out excessively high currents.

Figure 3:
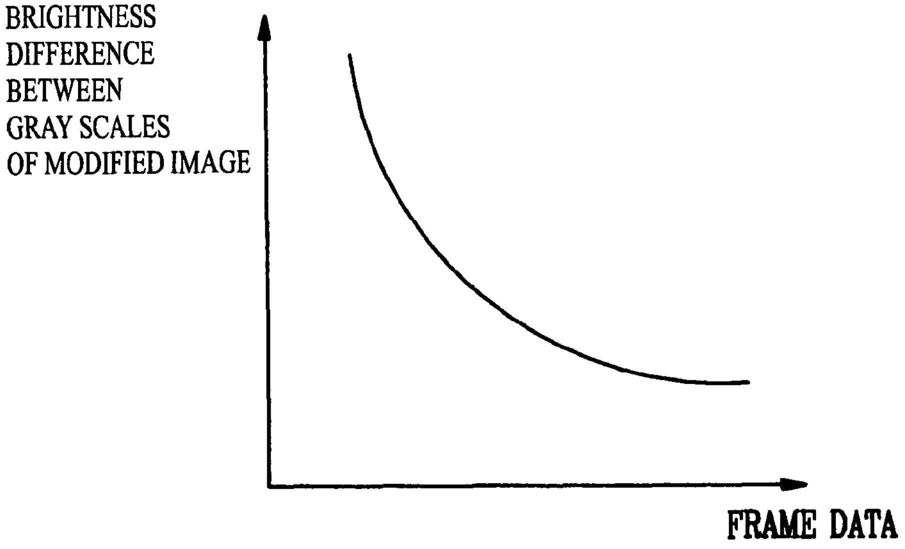
FIG. 3 is a graph showing a brightness variation of the electron emission display shown in FIG. 2.

Turning now to FIG. 3, FIG. 3 is a graph showing the limited brightness of the electron emission display of FIG. 2 based on the size of the frame data. Referring to FIG. 3, the horizontal axis indicates a size of frame data obtained by summing video data input during one frame and a vertical axis indicates the limited of brightness of an image. A change in the amount of brightness is set differently based on the size of the frame data. For this reason, when the size of the frame data is large, the change amount of brightness is set to be large so that the limited brightness is low. In contrast to this, when the size of the frame data is small, the change amount of brightness is set to be small so that the limited brightness is large as illustrated in FIG. 3.

If the frame data is large, parts expressing a bright image are included in the image much.

Accordingly, although the degree of reduction in brightness is large, the whole screen can still be recognized as being bright. In contrast to this, when the frame data is small, because parts expressing the bright image are included in the image only to a small extent, the brightness is reduced by a relatively small amount. Furthermore, in the case where the frame data is large, when an emission current flowing through the pixel portion is large, the power supply section should have a great output. However, when there is a limit to the brightness, the emission current is also limited, so that the power supply section does not have the great output.

When the brightness is greatly limited, there is a smaller difference in brightness between gray scales in the limited image, but no longer the great brightness difference therebetween in a bright image. Thus, the brightness is adjusted to a form responding to a person's sight sense. Specifically, the person's eyes sense a brightness change of a dark image better than that of a bright image. Consequently, it is unnecessary to further decrease a brightness difference in the dark image. Conversely, it is necessary to increase the brightness difference in the bright image. As a result, as shown in FIG. 3, when a reduction amount of an image brightness in a case of the dim image is smaller than that in a case of a dim image, the resultant image is better suitable for characteristics of the person's eyes.

In other words, when a size of frame data is large, brightness is limited by a large amount, so that a brightness variations of a gray scale becomes smaller than a predetermined value. In contrast to this, when a size of frame data is small, the brightness is limited by a relatively small amount, so that the brightness variations of a high gray scale is equal to or higher than the predetermined value. Accordingly, when the size of the frame data is large, the image can be more darkly represented. Thus, the brightness is significantly changed, so that a change of the brightness is easily sensed. Conversely, when the size of the frame data is small, the image is dimly represented. Although the change of the brightness is not great, a change of the brightness is easily sensed.

In summary, when the overall image is bright, the size of the frame data is large and the reduction in brightness is also large so that the brightness difference between gray scales becomes small so that the power supply will not be overloaded while the viewer can still perceive changes in brightness between pixels in the modified image. When the overall image is dim, the size of the frame data is small and the reduction in brightness is small so that the brightness difference between gray scales can remain large so that the viewer can still perceive changes in brightness between pixels in the modified image. As a result, the brightness difference between gray scales of the modified dim image becomes larger than the brightness difference between gray scales of the modified bright image. The resultant modified images produces enhanced contrast for bright and dim images while preventing the power supply from being overloaded.

Figure 4:
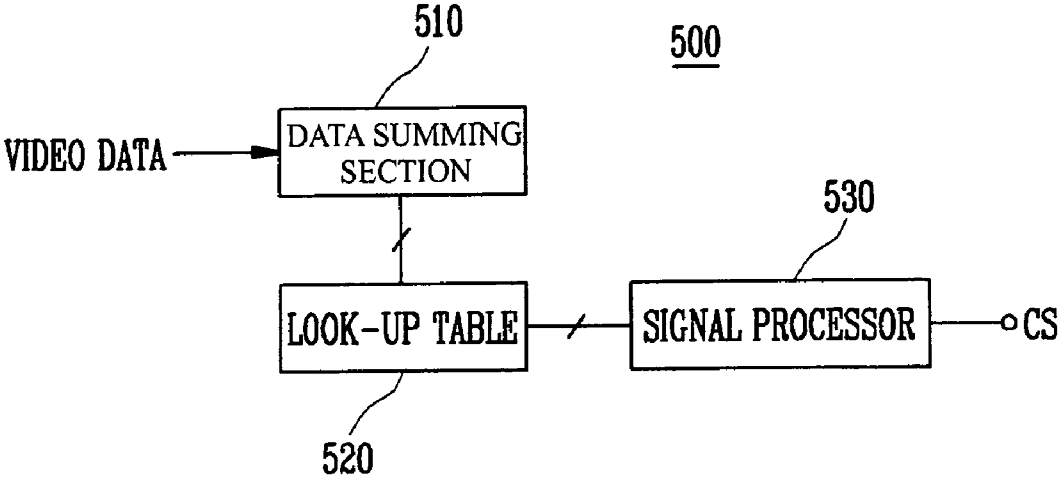
FIG. 4 is a view showing an example of a data processor of the electron emission display shown in FIG. 2.

FIG. 4 is a view showing an example of a data processor of the electron emission display shown in FIG. 2. With reference to FIG. 4, the data processor 500 includes a data summing section 510, a look-up table 520, and a signal processor 530.

The data summing section 510 sums video data corresponding to one frame to generate frame data. Large frame data means that parts, such as a white color representing a high gray scale, are included much in one frame to be represented. Small frame data means that much dark background representing a lower gray scale is included in the one frame to be represented.

The look-up table 520 stores information with respect to a voltage level by sizes of frame data output from the power supply section 600. Accordingly, the look-up table 520 stores information for at least one voltage level among levels of an anode voltage, a cathode voltage, and a gate voltage by frame data. Furthermore, the size of the look-up table 520 can be decreased because only the upper bits (i.e., the most significant bits) of the frame data are used rather than the full frame data. As a result, a small storage capacity memory is sufficient to store enough of the small sized look-up table. Therefore, production costs can be correspondingly reduced.

At this time, a change of the brightness is formed according to the voltage level stored in the look-up table 520 as shown in FIG. 4. The signal processor 530 reads the frame data generated by the data summing section 510, searches for a voltage level corresponding to the frame data from the look-up table 520, and provides a control signal corresponding to the voltage level to the power supply section 600.

Figure 5:
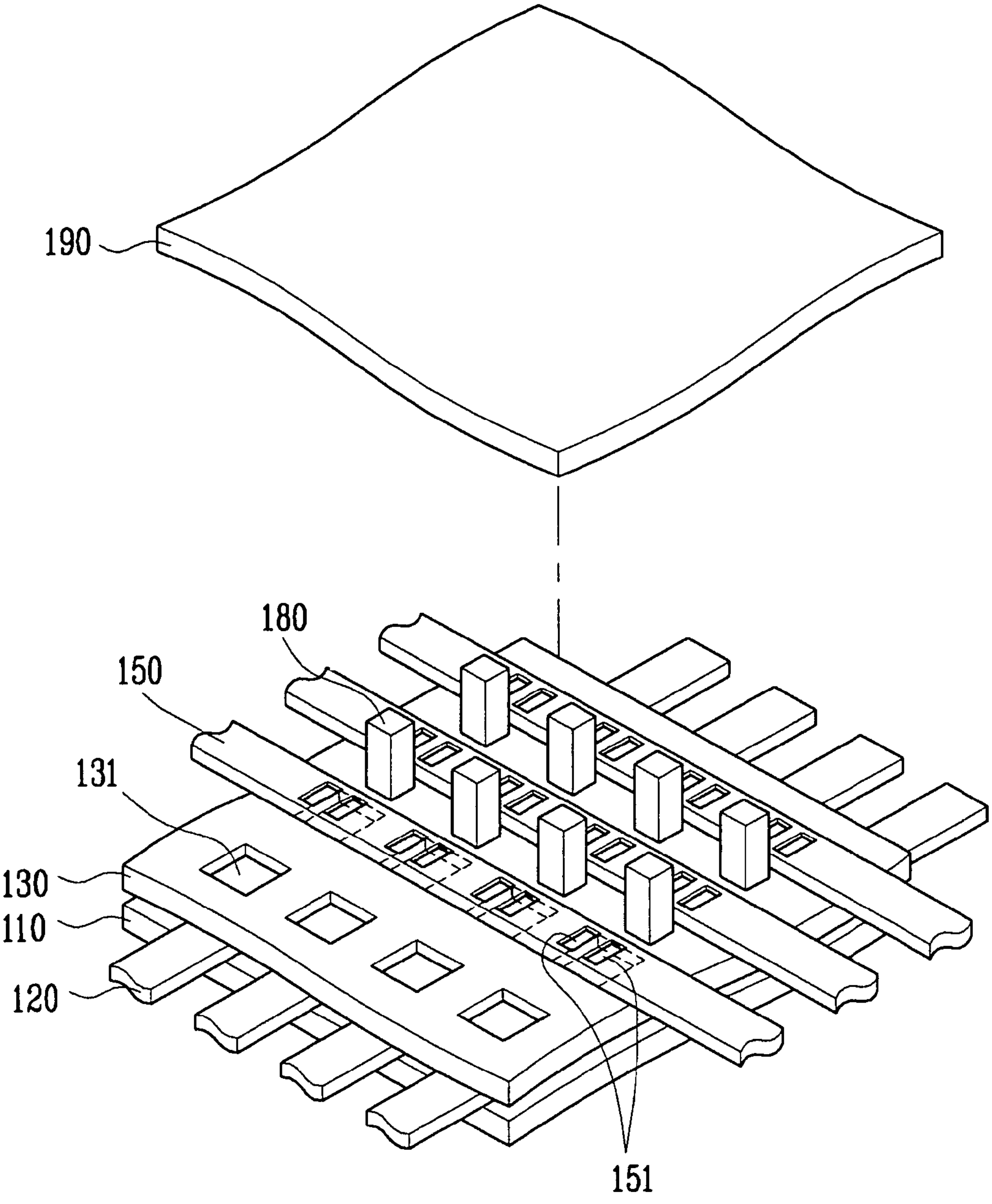
FIG. 5 is a perspective view showing an example of a pixel portion of the electron emission display shown in FIG. 2.
Figure 6:
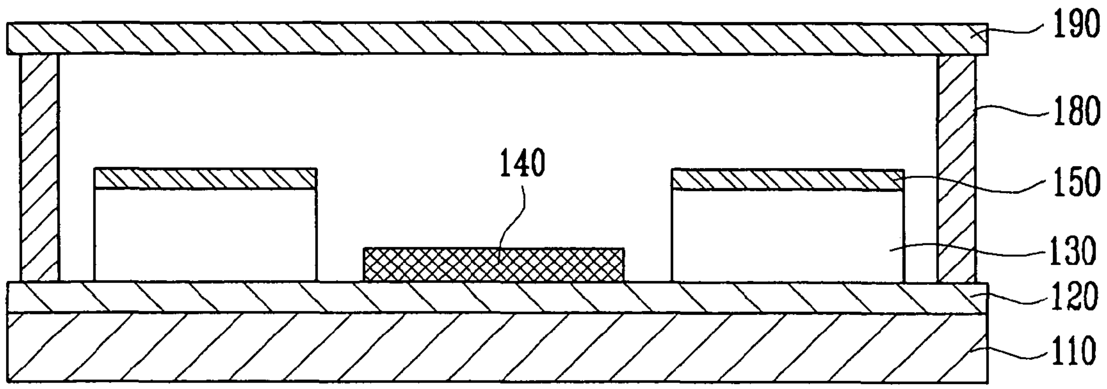
FIG. 6 is a cross-sectional view of the pixel portion shown in FIG. 5.

Turning now to FIGS. 5 and 6, FIG. 5 is a perspective view showing an example of a pixel portion 100 of the electron emission display of FIG. 2, and FIG. 6 is a cross-sectional view of the pixel portion 100 shown in FIG. 5. Referring to FIGS. 5 and 6, the electron emission display includes a lower substrate 110, an upper substrate 190, and a spacer 180. Cathode electrodes 120, an insulation layer 130, an electron emission section 140, gate electrodes 150 are sequentially formed on the lower substrate 110, and a front substrate, an anode electrode, and a fluorescent film are formed on the upper substrate 190. The spacer 180 provides a gap between the lower substrate 110 and the upper substrate 190. A least one cathode electrode 120 is formed in a stripe shape on the lower substrate 110, and an insulation layer 130 is formed at an upper portion of the cathode electrode 120. A plurality of first grooves 131 are formed at the insulation layer 130 to expose a part of the cathode electrode 120. At least one gate electrode 150 is formed at an upper portion of the insulation layer 130. A plurality of second grooves 151 having predetermined sizes are formed at the gate electrode 150, and each of the second grooves 151 is formed at an upper portion of each of the first grooves 131. Furthermore, an electron emission section 140 is disposed at a location corresponding to the first groove 131 and the second groove 151 at the upper portion of the cathode electrode 120.

A glass or silicon substrate is used as the lower substrate 110. When the lower substrate 110 is formed by a rear surface exposure using paste, it is preferred that the lower substrate is a transparent substrate such as a glass substrate.

The cathode electrode 120 provides a data signal from the data driver (not shown) or a scan signal from the scan driver (not shown) to the electron emission section 140. ITO (Indium Tin Oxide) is used as the cathode electrode 120. The insulation layer 130 is formed at upper portions of the lower substrate 110 and the cathode electrode 120, and electrically insulates the cathode electrode 120 and the gate electrode 150 from each other.

The gate electrode 150 is disposed in a predetermined shape, for example, a stripe shape on the insulation layer 130 across the cathode electrode 120, and provides the data signal from the data driver 200 or the scan signal from the scan driver 300 to respective pixels. The gate electrode 150 is made out of a metal of having excellent conductivity, such as one or more of gold (Au), silver (Ag), platinum (Pt), aluminum (Al), chromium (Cr), and an alloy thereof.

The electron emission sections 140 are electrically connected to an upper portion of the cathode electrode 120 exposed by the first opening 131 of the insulation layer 130, respectively. It is preferable that the electron emission section 140 is made out of a material that emits electrons upon application of an electric field. Carbon system materials, nanometers (nm) size materials, carbon nanotube, graphite, graphite nanofiber, carbon on diamond, $C_{60}$, silicon nanofiber, and a combination material are examples of materials that are suitable for the electron emission section 140.

Electrons emitted from the electron emission section 140 collide with the upper substrate 190 to emit light, so that an image can be formed. The upper substrate 190 includes a substrate, an anode electrode, a fluorescent substance, a light shielding film, and a metal protection film. It is preferred that the substrate is made out of a transparent material such as glass, so that light emitted from the fluorescent substance is pass through to an exterior.

It is preferred that the anode electrode also made out of a transparent material such as ITO, so that light emitted from the fluorescent substance can pass to an exterior. The anode electrode better accelerates electrons emitted from an electron emission element. In order to achieve this acceleration, a positive (+) high voltage is applied to the anode electrode so that electrons can be accelerated in the direction of the fluorescent substance.

The fluorescent substance emits light by collision with electrons emitted from the electron emission section 140, and is selectively disposed on the anode electrode with a predetermined gap therebetween. ZnS:Cu, $Zn_2SiO_4$:Mn, ZnS:Cu+ $Zn_2SiO_4$:Mn, $Gd_2O_2S$:Tb, $Y_3Al_5O_{12}$:Ce, ZnS:Cu,Al, $Y_2O_2S$:Tb, ZnO:Zn, ZnS:Cu,Al+$In_2O_3$, $LaPO_4$:Ce,Tb, BaO.6$Al_2O_3$:Mn, (Zn,Cd)S:Ag, (Zn,Cd)S:Cu,Al,ZnS:Cu, Au,Al, $Y_3(Al,Ga)_2O_{12}$:Tb, $Y_2SiO_5$:Tb, or LaOCl:Tb are examples of a green fluorescent substance. ZnS:Ag, ZnS:Ag, Al, ZnS:Ag,Ga,Al, ZnS:Ag,Cu,Ga,Cl, ZnS:Ag+$In_2O_3$, $Ca_2B_5O_9Cl$:$Eu^{2+}$, $(Sr,Ca,Ba,Mg)_{10}(PO_4)_6Cl_2$:$Eu^{2+}$, $Sr_{10}(PO_4)_6C_2$:$Eu^{2+}$, $BaMgAl_{16}O_{26}$:$Eu^{2+}$, CoO,$Al_2O_3$ added ZnS:Ag, ZnS:Ag or Ga are examples of blue fluorescent substances. $Y_2O_2S$:Eu, $Zn_3(PO_4)_2$:Mn, $Y_2O_3$:Eu, $YVO_4$:Eu, (Y,Gd)$BO_3$:Eu, γ-$Zn_3(PO_4)_2$:Mn, (ZnCd)S:Ag, (ZnCd)S:Ag+ $In_2O_3$, or $Fe_2O_3$ added $Y_2O_2S$:Eu are examples of red fluorescent substances. A light shielding film is disposed between fluorescent substances with a gap therebetween. The light shielding substance serves to absorb and shield external light and prevent optical crosstalk so that the bright to dark ratio can be enhanced.

The metal protection film is formed on the fluorescent substance, and serves to better concentrate the electrons emitted from the electron emission section 140. The metal protection film also serves to reflect light emitted from the fluorescent substance by the collisions of electrons in order to enhance reflection efficiency. On the other hand, if the metal protection film serves as an anode electrode, the formation of the anode electrode is selective, and can be an unnecessary element.

Figure 7:
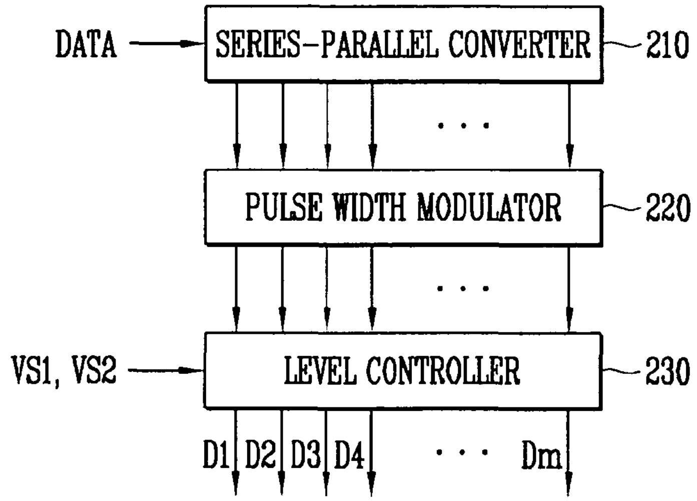
FIG. 7 is a view showing an example of a data driver of the electron emission display shown in FIG. 2.

Turning now to FIG. 7, FIG. 7 is a view showing an example of a data driver 200 of the electron emission display shown in FIG. 2. With reference to FIG. 7, the data driver 200 includes a series-parallel converter 210, a pulse width modulator 220, and a level controller 230.

The series-parallel converter 210 converts and outputs sequentially input image data into parallel image data. The pulse width modulator 220 performs a pulse width modulation of the parallel image data from the series-parallel converter 210 and output a pulse width modulated signal. Consequently, if the parallel image data are data corresponding to a higher gray scale, an output data signal of the pulse width modulator 220 has a wide pulse width. Conversely, if the parallel data are data corresponding a lower gray scale, the output data signal of the pulse width modulator 220 has a narrow pulse width.

The level controller 230 controls a voltage level of the output data signal of the pulse width modulator 220 according to first and second power supplies VS1 and VS2 applied from power supply section 600 and outputs the output data signal of the pulse width modulator 220 in which the voltage level is controlled, to the data lines D1, D2, . . . Dm. Specifically, a high level voltage of output data of the level controller 230 corresponds to a voltage of the first power supply VS1, whereas a low level voltage thereof corresponds to a voltage of the second power supply VS2. Accordingly, as the voltage of the first power supply VS1 and/or the voltage of the second power supply VS2 change, the high level voltage and/or the low level voltage of the data signal are also changed. In a case where the data lines D1, D2, . . . Dm are used as the cathode electrode, when the data signal has a low level voltage, namely, the voltage of the second power supply VS2, the electron emission element emits the electrons. Accordingly, the power supply section changes the voltage level of the second power supply VS2 that allows a voltage difference between the gate electrode and the cathode electrode during an electron emission to be varied. At this time, the voltage level of the first power supply VS1 can be unchanged. Further, the voltage level of the first power supply VS1 can be changed according to a change of the second power supply VS2. In addition, in a case where the data lines D1, D2, . . . Dm are used as the gate electrode, when the data signal has a high level voltage, namely, the voltage of the first power supply VS1, the electron emission element emits the electrons. Consequently, the power supply section changes the voltage level of the first power supply VS1, thus causing a voltage difference between the gate electrode and the cathode electrode during the electron emission to be varied. At this time, the voltage level of the first power supply VS1 can be unchanged. Further, the voltage level of the second power supply VS2 can be changed according to a change of the first power supply VS1.

If a voltage level controller controls only a voltage level of an output scan signal of the scan driver but does not control a voltage level of an output data signal of the data driver, each voltage level of the first power supply VS1 and the second power supply VS2 can be unchanged. Moreover, the data driver can directly transfer an output data signal of the pulse width modulator 220 to the data lines D1, D2 . . . Dm without including the level controller 230.

Figure 8:
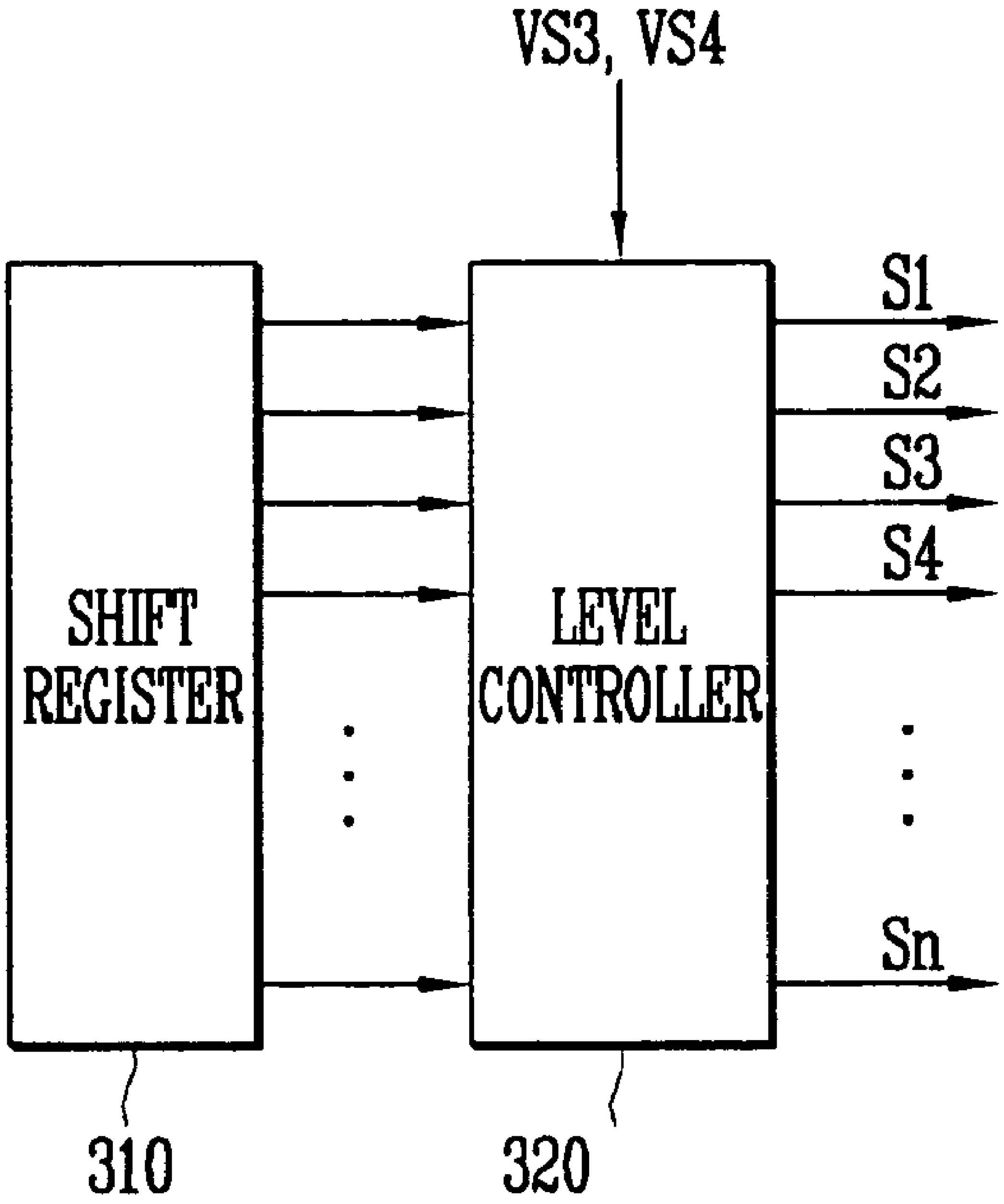
FIG. 8 is a view showing an example of a scan driver of the electron emission display shown in FIG. 2.

Turning now to FIG. 8, FIG. 8 is a view showing an example of a scan driver 300 of the electron emission display shown in FIG. 2. Referring to FIG. 8, the scan driver includes a shift register 310 and a level controller 320.

The shift register 310 performs a function of sequentially outputting the scan signal. The level controller 320 controls a voltage level of the scan signal outputted from the shift register 310 according to third and fourth power supplies VS3 and VS4 applied from a power supply section 600 and outputs the scan signal in which the voltage level is controlled, to the scan lines S1, S2, . . . Sn. Specifically, a high level voltage of an output data of the level controller 320 corresponds to a voltage of the third power supply VS3, whereas a low level voltage thereof corresponds to a voltage of the fourth power supply VS4. Accordingly, as the voltage of the third power supply VS3 and/or the voltage of the fourth power supply VS4 change, the high level voltage and/or the low level voltage of the data signal is also changed. In a case where the scan lines S 1, S2, . . . Sn are used as the cathode electrode, when the scan signal has a low level voltage, namely, the voltage of the fourth power supply VS4, the electron emission element emits the electrons. Accordingly, the power supply section changes the voltage level of the fourth power supply VS4 that allows a voltage difference between the gate electrode and the cathode electrode during an electron emission to be varied. At this time, the voltage level of the third power supply VS3 can be unchanged. Further, the voltage level of the third power supply VS3 can be changed according to a change of the fourth power supply VS4. In addition, in a case where the scan lines S1, S2, . . . Sn are used as the gate electrode, when the scan signal has a high level voltage, namely, the voltage of the third power supply VS3, the electron emission element emits the electrons. Consequently, the power supply section changes the voltage level of the third power supply VS3, thus causing a voltage difference between the gate electrode and the cathode electrode during the electron emission to be varied. At this time, the voltage level of the third power supply VS3 can be unchanged. Further, the voltage level of the fourth power supply VS4 can be changed according to a change of the third power supply VS3.

If a voltage level controller controls only a voltage level of an output data signal of the data driver but does not control a voltage level of an output scan signal of the scan driver, each voltage level of the third power supply VS3 and the fourth power supply VS4 can be unchanged. Moreover, the scan driver can directly transfer the scan signal from the shift register 310 to the scan lines S1, S2, . . . Sn without including the level controller 320.

In the electron emission display and a driving method thereof, when the electron emission display expresses high gray scale, it limits brightness of each pixel in order to reduce power consumption and prevent gradual failure from occurring. Change amount by gray scales in low and high brightness are set to be different from each other so that a user visibly recognizes the change of brightness better.

While the present invention has been particularly shown and described with reference to exemplary embodiments thereof, it will be understood by those of ordinary skill in the art that various changes in form and details maybe made therein without departing from the spirit and scope of the present invention as defined by the following claims.

What is claimed is:

1. An electron emission display, comprising:

a pixel portion adapted to receive a data signal and a scan signal, the pixel portion being further adapted to display an image;

a data driver adapted to generate the data signal using video data, the data driver being further adapted to transfer the data signal to the pixel portion;

a scan driver adapted to transfer the scan signal to the pixel portion;

a timing controller adapted to transfer a drive signal to the data driver and to the scan driver, the drive signal driving the data driver and the scan driver;

a data processor adapted to generate a control signal corresponding to a size of frame data obtained by summing video data input during one frame; and a power supply section adapted to generate a drive voltage and to transfer the drive voltage to the pixel portion, the data driver, the scan driver, the timing controller, and the data processor, wherein the drive voltage is controlled by the control signal, and a brightness of the pixel portion is varied according to the drive voltage controlled by the control signal, and the brightness is varied by an amount which is determined based upon a size of the frame data obtained by the summing of the video data during the one frame;

wherein the data processor comprises a signal processor adapted to generate the control signal in correspondence to a desired output voltage of the power supply section, the signal processor being further adapted to control the drive voltage from the power supply section with the control signal in order to adjust the brightness.

2. The electron emission display as claimed in claim 1, wherein the data processor further comprises:

a data summing section adapted to sum together the size of video data input during the one frame in order to generate the frame data; and a look-up table adapted to store the desired output voltage of the power supply section corresponding to the frame data.

3. The electron emission display as claimed in claim 1, wherein the brightness is varied by an amount which is large and small when the size of the frame data is large and small, respectively.

4. The electron emission display as claimed in claim 2, wherein the power supply section is adapted to adjust at least one drive voltage of the pixel portion, the scan driver, and the data driver in order to adjust any one of a voltage applied to the pixel portion, an output voltage of the scan driver, and an output voltage of the data driver.

5. The electron emission display as claimed in claim 1, wherein the pixel portion comprises:

a lower substrate;

a cathode electrode arranged in a stripe shape on the lower substrate;

a first insulation film arranged on the lower substrate and on the cathode electrode, the first insulating film comprising a first aperture exposing a part of the cathode electrode;

a gate electrode arranged on the first insulation film and across the cathode electrode, the gate electrode comprising a second aperture corresponding to the first aperture;

an electron emission section arranged on the cathode electrode and corresponding to the first and second apertures;

an upper substrate spaced apart from the lower substrate by a predetermined distance, the upper substrate comprising a fluorescent film adapted to emit light by an electron emitted by the electron emission section and an anode electrode to which a high voltage is applied; and a spacer adapted to provide the predetermined distance between the lower and upper substrates.

6. The electron emission display as claimed in claim 5, wherein the power supply section is further adapted to adjust at least one voltage level of the cathode electrode, the gate electrode, and the anode electrode.

7. A method of driving an electron emission display, comprising the steps of:

determining a size of frame data input during one frame by summing together video data of one frame;

adjusting a voltage level of a drive power supply based upon the size of the frame data; and adjusting a brightness according to the adjustment of the voltage level of the drive power supply, and differently adjusting a change amount of the brightness according to the size of the frame data;

wherein the step of adjusting the voltage level of the drive power supply based upon the size of the frame data is achieved by accessing a look-up table that is adapted to store a desired voltage level of the drive power supply.

8. The method of claim 7, wherein the look-up table is composed of most significant bits of the frame data.

9. The method of claim 7, wherein the brightness is changed by an amount which is small when a size of the frame data is small and is changed by an amount which is large when the size of the frame data is large.

10. The method of claim 7, wherein the voltage level of the drive power supply adjusts at least one voltage level of an anode, a cathode, and a gate electrode of a pixel portion.

* * * * *